United States Patent
Bauschke et al.

(10) Patent No.: US 10,156,480 B2
(45) Date of Patent: Dec. 18, 2018

(54) THERMOWELL VIBRATION FREQUENCY DIAGNOSTIC

(75) Inventors: Dirk Willy Bauschke, Shakopee, MN (US); Lara Ivey Kauchak, Victoria, MN (US); Duyen Mong-Thi Pham, Maple Grove, MN (US)

(73) Assignee: Rosemount Inc., Eden Prairie, MN (US)

( * ) Notice: Subject to any disclaimer, the term of this patent is extended or adjusted under 35 U.S.C. 154(b) by 314 days.

(21) Appl. No.: 12/584,340

(22) Filed: Sep. 3, 2009

(65) Prior Publication Data

US 2011/0054822 A1 Mar. 3, 2011

(51) Int. Cl.
*G01K 15/00* (2006.01)
*G01K 19/00* (2006.01)
*G01K 1/08* (2006.01)
*G01K 13/02* (2006.01)

(52) U.S. Cl.
CPC ............... *G01K 1/08* (2013.01); *G01K 13/02* (2013.01); *G01K 15/00* (2013.01); *G01K 15/007* (2013.01)

(58) Field of Classification Search
CPC ...... G01K 15/00; G01M 13/028; G01M 7/00; G05B 23/02
USPC .............................................. 702/56, 99, 183
See application file for complete search history.

(56) References Cited

U.S. PATENT DOCUMENTS

| | | | |
|---|---|---|---|
| 4,064,756 A * | 12/1977 | MacLean et al. | 374/138 |
| 4,754,646 A * | 7/1988 | EerNisse et al. | 73/702 |
| 5,048,323 A * | 9/1991 | Stansfeld et al. | 73/32 A |
| 5,511,427 A | 4/1996 | Burns | |
| 6,053,047 A * | 4/2000 | Dister et al. | 73/593 |
| 6,082,737 A | 7/2000 | Williamson et al. | |
| 6,227,703 B1 * | 5/2001 | DiMatteo et al. | 374/208 |
| 6,390,670 B1 * | 5/2002 | Nimberger | C08L 79/08 374/142 |
| 6,485,175 B1 | 11/2002 | Nimberger | |
| 6,601,005 B1 | 7/2003 | Eryurek et al. | |
| 6,948,884 B2 * | 9/2005 | Xu | E21B 17/01 405/211 |

(Continued)

FOREIGN PATENT DOCUMENTS

| | | |
|---|---|---|
| CN | 1853098 A | 10/2006 |
| JP | H01-257225 | 10/1989 |

(Continued)

OTHER PUBLICATIONS

Definition of Measure, Web Dictionary, printed Sep. 16, 2017.*

(Continued)

*Primary Examiner* — Michael P Nghiem
(74) *Attorney, Agent, or Firm* — Kinney & Lange, P.A.

(57) ABSTRACT

An apparatus and a method monitor condition of a temperature measurement point in an industrial process system by sensing vibration frequency of a thermowell positioned in a process fluid flow passage and providing a diagnostic output based upon the vibration frequency sensed. The apparatus includes a temperature measurement point having a thermowell, a vibration sensor, a temperature sensor, and a transmitter. The vibration sensor is fixedly attached to the thermowell, and the temperature sensor is positioned inside a bore cavity of the thermowell. The transmitter is electrically connected to both the temperature sensor and the vibration sensor.

14 Claims, 8 Drawing Sheets

(56) References Cited

U.S. PATENT DOCUMENTS

| | | | |
|---|---|---|---|
| 2005/0011278 A1* | 1/2005 | Brown | G01F 1/666 73/861.18 |
| 2005/0072239 A1 | 4/2005 | Longsdorf et al. | |
| 2008/0141769 A1 | 6/2008 | Schmidt et al. | |
| 2009/0082976 A1* | 3/2009 | Anuzis | G01M 15/14 702/35 |
| 2009/0153144 A1* | 6/2009 | Hansen | G05B 23/0229 324/511 |
| 2009/0211368 A1 | 8/2009 | Garnett et al. | |
| 2010/0123591 A1* | 5/2010 | Bauschke et al. | 340/656 |
| 2010/0316086 A1* | 12/2010 | Engelstad et al. | 374/1 |
| 2013/0283928 A1* | 10/2013 | Wiklund | G01K 1/08 73/861.18 |
| 2014/0269828 A1* | 9/2014 | Engelstad | G01H 11/06 374/142 |
| 2015/0308866 A1* | 10/2015 | Wiklund | G01F 1/20 73/861.18 |

FOREIGN PATENT DOCUMENTS

| | | | |
|---|---|---|---|
| JP | 08136353 | * | 5/1996 |
| JP | H11-014447 | | 1/1999 |
| JP | 2000-343379 | | 12/2000 |
| JP | 2003-058976 | | 2/2003 |
| JP | 2003-065328 | | 3/2003 |
| JP | 2005-308732 | | 11/2005 |
| KR | 4100377 A | | 12/2004 |
| WO | WO2007/006128 A2 | | 6/2007 |

OTHER PUBLICATIONS

Official Search Report and Written Opinion of the Patent Cooperation Treat Office in the foreign counterpart Application No. PCT/US2010/001667, filed Jun. 10, 2010.
Blevins, R. D.,et al. Vortex-Induced Vibration and Damping of Thermowells, Article No. FI970150, Journal of Fluids and Structures, 1998, 12, 427-444.
ASME, PTC 19.3-1974 Temperature Measurement, 1974, 3-5.
Japanese Office Action, dated Dec. 11, 2013.
Chinese Second Office Action, dated Sep. 30, 2013.
Trerice, "What is a Thermowell?", pamphlet, 2 pages, 2001.
Extended European Search Report for European Patent Application No. 10814044.3, dated Mar. 17, 2016, 8 pages.
Canadian Office Action, for Canadian Patent Application No. 2,773,167, dated Jun. 7, 2017, 5 pages.

* cited by examiner

THERMOWELL VIBRATION FREQUENCY DIAGNOSTIC

BACKGROUND

The present invention relates to thermowells, and in particular, to thermowell vibration.

Thermowells are used in the process control industry to house temperature sensors. A thermowell is typically a long, cylindrical tube that is sealed at one end and open at the other end. The temperature sensor is inserted in the open end of the thermowell and the thermowell is inserted into a process fluid. This arrangement allows the temperature sensor to measure temperature of the process fluid without being directly exposed to the process fluid. This can be helpful to protect the temperature sensor when the process fluid is hazardous to the temperature sensor.

In many applications, the thermowell is inserted in a process where the process fluid flows over and around the thermowell. This can cause turbulence, eddies, and vortices, which can cause the thermowell to vibrate. In certain circumstances, such vibrations can cause the thermowell to oscillate at its natural frequency. Oscillation at the thermowell's natural frequency can cause the thermowell to fail from fatigue, ultimately cracking or even breaking off. Such failure can cause the temperature sensor to fail and the entire process to require shut-down. In some processes, any breach in a process barrier such as thermowell failure can cause fires, environmental damage, or other hazardous situations.

SUMMARY

The present invention includes both a method and an apparatus. One embodiment of the present invention is a method for monitoring condition of a temperature measurement point in an industrial process system. Vibration frequency of a thermowell positioned in a process fluid flow passage is sensed. A diagnostic output is provided based upon the vibration frequency.

Another embodiment of the present invention is a temperature measurement point including a thermowell, a vibration sensor, a temperature sensor, and a transmitter. The vibration sensor is fixedly attached to the thermowell, and the temperature sensor is positioned inside a bore cavity of the thermowell. The transmitter is electrically connected to both the temperature sensor and the vibration sensor.

Yet another embodiment of the present invention is a transmitter, including a first terminal, a second terminal, a microprocessor, and communication circuitry. The first terminal is configured to electrically connect to a temperature sensor, and the second terminal is configured to electrically connect to a vibration sensor. The microprocessor is electrically connected to each of the first and second terminals. The microprocessor is programmed to calculate temperature values based upon data received from the first terminal, to calculate vibration frequency based upon data received from the second terminal, to compare the vibration frequency to a target frequency, and to generate a diagnostic output of a thermowell based upon the comparison of the vibration frequency to the target frequency. The communication circuitry is electrically connected to the microprocessor and programmed to transmit the temperature values and the diagnostic output to a user interface.

Still another embodiment of the present invention is an assembly including a thermowell and a vibration sensor. The thermowell includes a connection portion configured to connect the thermowell to a process barrier. The thermowell has a first thermowell surface on a process side of the connection portion and a second thermowell surface on a non-process side of the connection portion. The vibration sensor is fixedly attached to the second thermowell surface.

DETAILED DESCRIPTION

In general, the present invention includes a method and apparatus for in-process measurement of thermowell vibration frequency and comparing that frequency to the thermowell's natural frequency. This can be performed by a transmitter that is electrically connected to an accelerometer that is fixedly connected to the thermowell. If the thermowell is found to be vibrating near its natural frequency, an alert can be emitted, signaling a user that thermowell failure may be imminent.

Figure 1A:
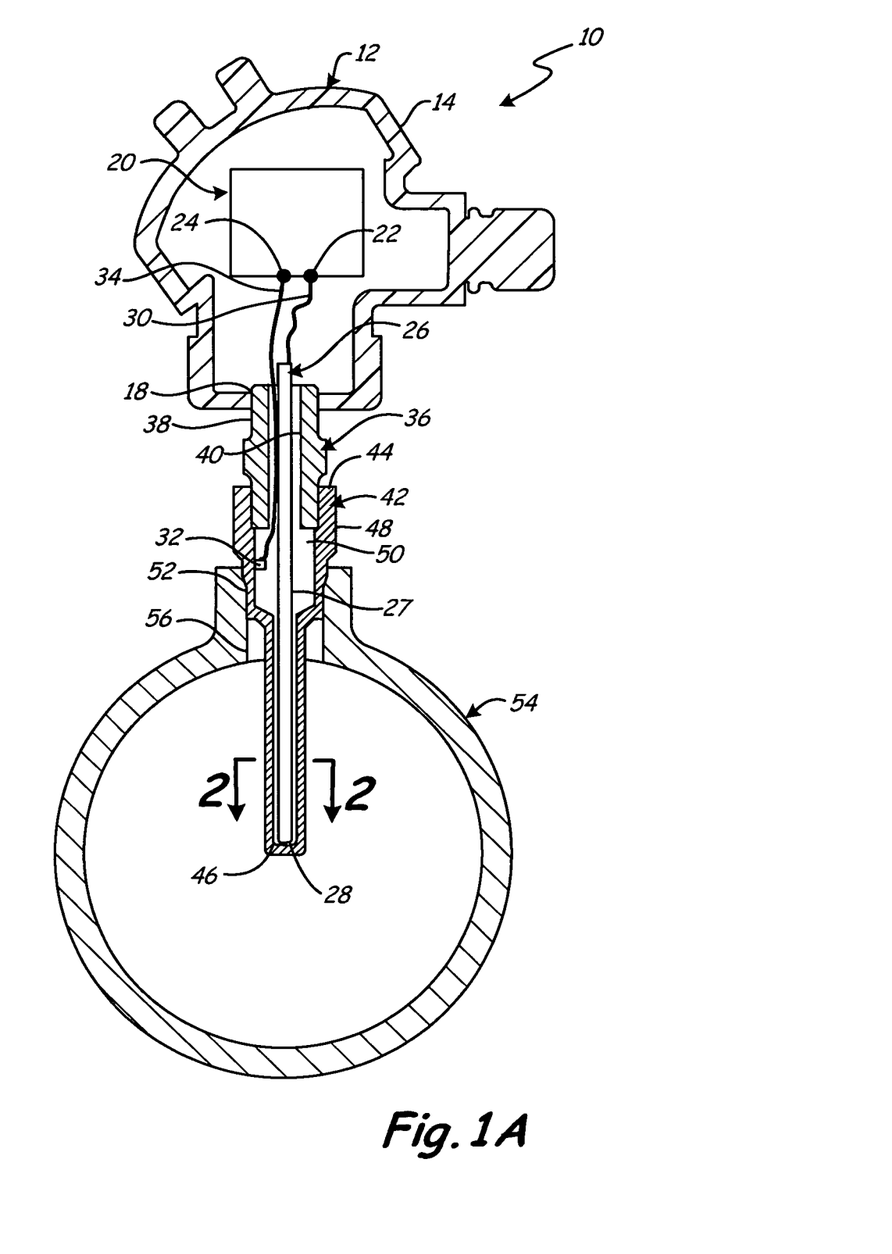
FIG. 1A is a cut-away elevation view of a temperature measurement point.

FIG. 1A is cut-away view of temperature measurement point 10. According to one embodiment, temperature measurement point 10 includes transmitter 12 (which includes housing 14, housing hole 18, transmitter circuitry 20, temperature sensor terminal 22, and vibration sensor terminal 24), temperature sensor 26 (which includes protection tube 27, temperature sensor tip 28, and temperature sensor lead 30), vibration sensor 32 (which includes vibration sensor lead 34), thermowell fitting 36 (which includes fitting exterior 38 and fitting passage 40), thermowell 42 (which includes proximal end 44, distal end 46, thermowell exterior surface 48, thermowell bore cavity 50, and process connection portion 52), and process flow passage 54 (which includes process hole 56).

Housing 14 encloses interior components of transmitter 12 including transmitter circuitry 20. Transmitter 12 also includes temperature sensor terminal 22 which can electrically connect to temperature sensor 26 via temperature sensor lead 30. Temperature sensor 26 can be virtually any temperature sensitive device such as a thermocouple or a resistance temperature detector (RTD). Temperature sensor 26 can be enclosed by a long, cylindrical protection tube 27. Transmitter 12 also includes vibration sensor terminal 24 which can electrically connect to vibration sensor 32 via vibration sensor lead 34. Vibration sensor 32 can be virtually any vibration sensitive device such as an accelerometer or strobe device. Temperature sensor lead 30 and vibration sensor lead 34 can each include a plurality of wires for making a plurality of electrical connections to a plurality of nodes at each of temperature sensor terminal 22 and vibration sensor terminal 24, respectively.

Thermowell fitting 36 has fitting exterior 38 for connecting at its top to housing hole 18 and for connecting at its bottom to thermowell 42. Thermowell fitting 36 also has fitting passage 40 sized to allow temperature sensor 26 and vibration sensor lead 34 to pass through.

Thermowell 42 can be a long, generally cylindrical well or tube, having bore cavity 50 that is open at proximal end 44 and closed at distal end 46. In the illustrated embodiment, thermowell 42 has a wider diameter near proximal end 44 and a narrower diameter near distal end 46. Thermowell 42 has process connection portion 52 on thermowell exterior surface 48 for connecting to an industrial process. In the illustrated embodiment, process connection portion 52 is a threaded area on exterior surface 48 for screwing into process hole 56 of process flow passage 54. Process connection portion 52 seals the industrial process so that process fluids do not flow from a process side of thermowell 42 to a non-process side of thermowell 42. The process side of thermowell 42 includes portions exposed to process fluids. The non-process side of thermowell 42 includes all portions of thermowell 42 that are isolated from process fluid, such as exterior surface 48 and bore cavity 50. Bore cavity 50 is sized to allow insertion of temperature sensor 26 so that temperature sensor tip 28 is near distal end 46. In the illustrated embodiment, vibration sensor 32 is fixedly attached to thermowell 42 inside bore cavity 50 near proximal end 44. In other embodiments, vibration sensor 32 can be fixedly attached to thermowell 42 at virtually any location that is isolated from hazardous process fluid, such as inside thermowell bore cavity 50 near distal end 46. A bore cavity of a conventional thermowell can be modified to include space for both vibration sensor 32 and temperature sensor 26.

Thermowell 42 can be inserted through process hole 56 into process flow passage 54 so that distal end 46 is in a process fluid flow path. In the illustrated embodiment, process flow passage 54 is a pipe. In alternative embodiments, process flow passage 54 can be virtually any structure where process fluid flows over a thermowell such as a tank where fluids are mixed.

Figure 1B:
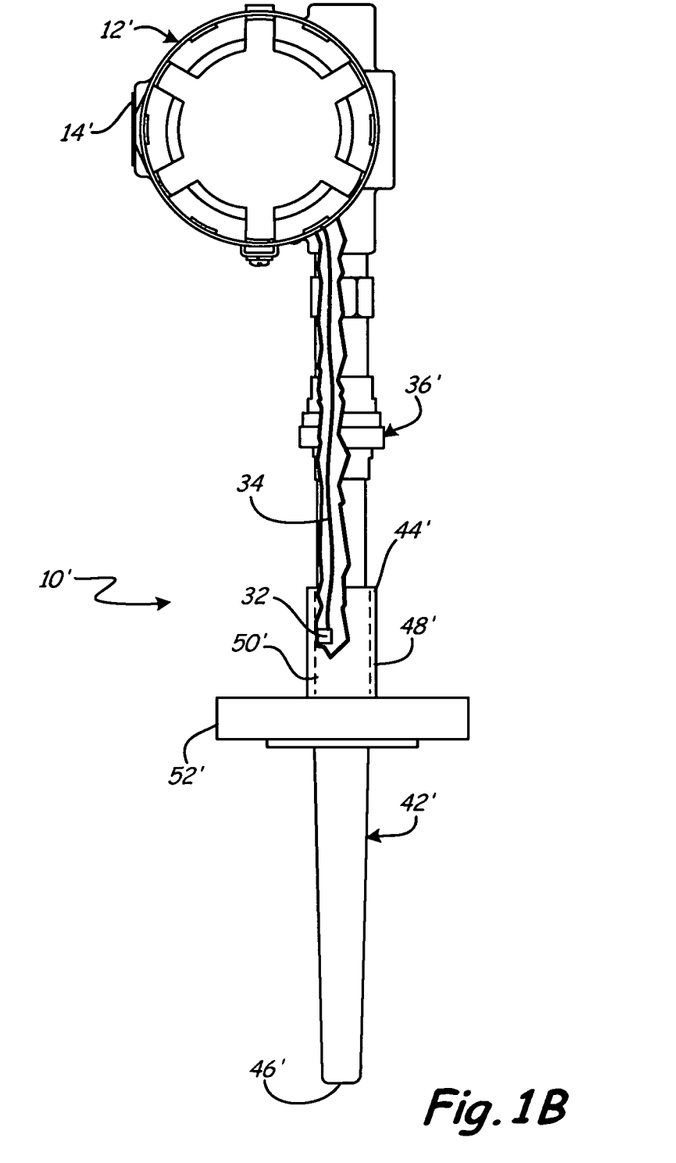
FIG. 1B is a partial cut-away elevation view of an alternative embodiment of the temperature measurement point of FIG. 1A.

FIG. 1B is a partial cut-away elevation view of an alternative embodiment of temperature measurement point 10 of FIG. 1A. Temperature measurement point 10' of FIG. 1B is similar to temperature measurement point 10 of FIG. 1A except that transmitter 12', thermowell fitting 36', and thermowell 42' have different structures than transmitter 12, thermowell fitting 36, and thermowell 42. Transmitter 12' has an alternative structure for housing 14' as compared to housing 14 of FIG. 1A. Thermowell fitting 36' is a three piece fitting as opposed to a single piece for thermowell fitting 36 of FIG. 1A.

Thermowell 42' also has an alternative structure as compared to thermowell 42 of FIG. 1A. Thermowell 42' has process connection portion 52' which comprises a flange welded to exterior surface 48' between proximal end 44' and distal end 46'. There is no threaded area on exterior surface 48'. Instead, thermowell 42' is connected by bolting or welding process connection portion 52' to process flow passage 54 (not shown in FIG. 1B). Vibration sensor 32 is again fixedly attached to thermowell 42' inside bore cavity 50'. Despite a difference in configuration, temperature measurement point 10' functions similarly to temperature measurement point 10 of FIG. 1A. In other embodiments, thermowell 42' can have other shapes and structures so long as vibration sensor 32 can be suitably attached.

Figure 1C:
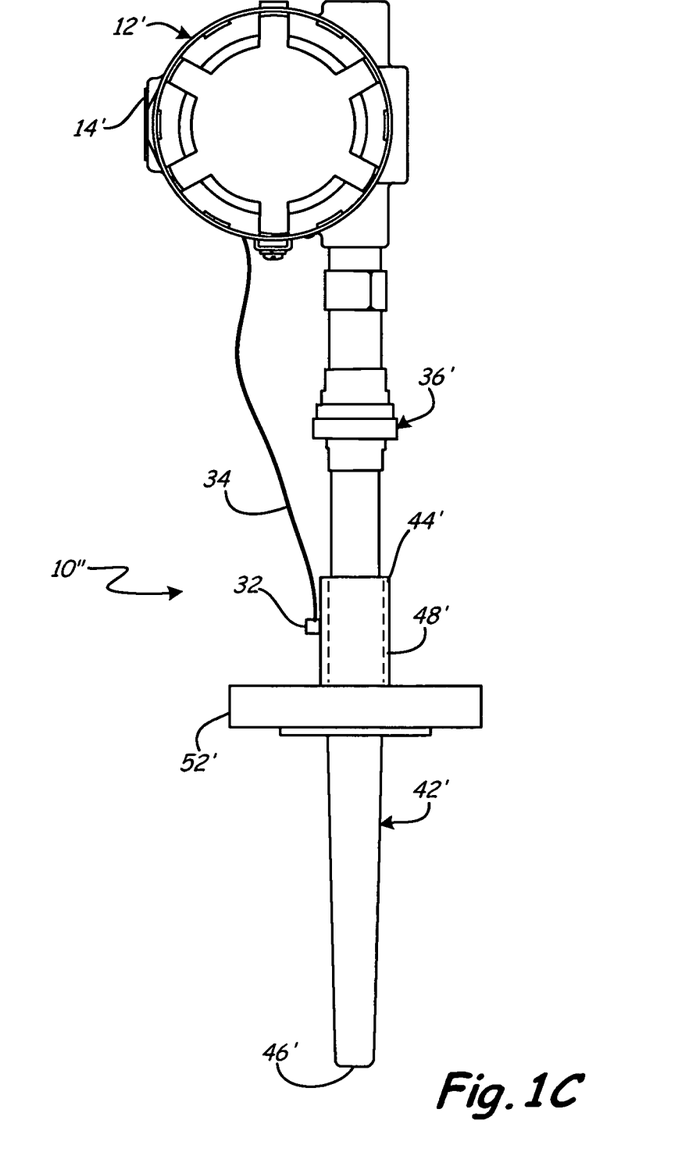
FIG. 1C is an elevation view of an alternative embodiment of the temperature measurement point of FIG. 1B.

FIG. 1C is an elevation view of an alternative embodiment of temperature measurement point 10' of FIG. 1B.

Temperature measurement point 10" of FIG. 1C is similar to temperature measurement point 10' of FIG. 1B except that vibration sensor 32 is connected to exterior surface 48' as opposed to inside bore cavity 50'. In the illustrated embodiment, vibration sensor 32 is connected to exterior surface 48' between proximal end 44' and process connection portion 52'. In other embodiments, vibration sensor 32 can be fixedly attached to thermowell 42' at virtually any location that is isolated from hazardous process fluid, such as connected to process connection portion 52'. Also in the illustrated embodiment, vibration sensor lead 34 is positioned exterior of thermowell fitting 36', as opposed to inside thermowell fitting 36' as in FIG. 1B. Despite a difference in configuration, temperature measurement point 10" functions similarly to temperature measurement point 10 of FIG. 1A and temperature measurement point 10' of FIG. 1B.

In each of the embodiments of FIGS. 1A, 1B, and 1C, vibration sensor 32 can be fixed to thermowell 42 or thermowell 42' by welding, bolting, or nearly any method that fixes vibration sensor 32 firmly enough to accurately sense vibration frequency of thermowell 42 or thermowell 42'. In another embodiment, vibration sensor 32 need not be directly fixed to thermowell 42 or thermowell 42' so long as vibration sensor 32 is positioned to accurately sense vibration frequency of thermowell 42 or thermowell 42'.

Figure 2:
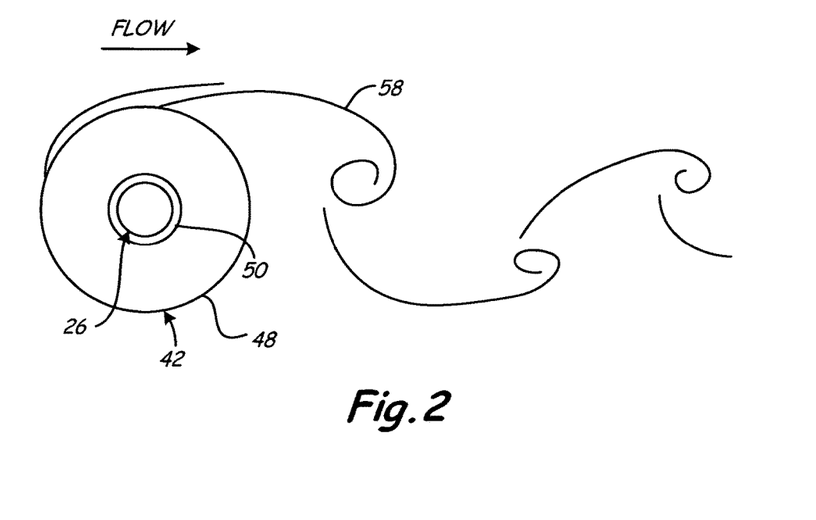
FIG. 2 is a top sectional view along section 2-2 of FIG. 1A.

FIG. 2 is a top sectional view of thermowell 42, along section 2-2 of FIG. 1A. In the illustrated embodiment, thermowell 42 is immersed in process fluid that is flowing in a direction from left to right. Process fluid that flows towards thermowell 42 is redirected around thermowell 42 by thermowell exterior surface 48. This condition can cause eddies, vortices, and turbulent flow 58 downstream of thermowell 42. Certain turbulent flow 58 can cause thermowell 42 to vibrate.

Figure 3:
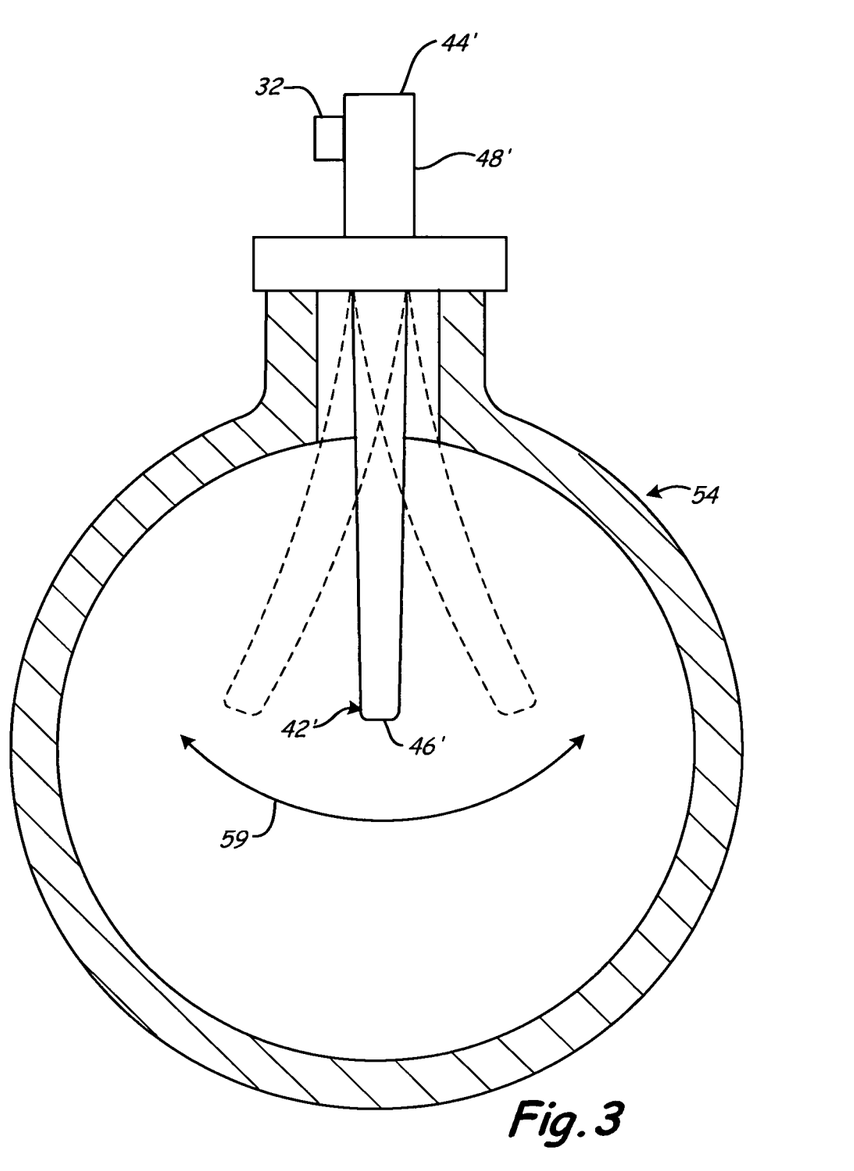
FIG. 3 is an elevation view of a thermowell of the temperature measurement point in FIG. 1B.

FIG. 3 is an elevation view of thermowell 42' in process flow passage 54. If process fluid flow creates turbulence that vibrates thermowell 42' at or near its natural frequency, thermowell 42' can oscillate back-and-forth with a relatively high amplitude. Oscillation arrows 59 show a direction of oscillation of thermowell 42. Amplitude of oscillation is exaggerated in FIG. 1C, for clarity. Nonetheless, thermowell oscillation at or near the natural frequency can cause catastrophic thermowell failure. Vibration of thermowell 42 induced by turbulence typically has a greater amplitude near distal end 46 than near proximal end 44; however, frequency of such vibration can be nearly identical at both ends. Consequently, frequency of vibration measured by vibration sensor 32 mounted near proximal end 44 can be representative of frequency of vibration at distal end 46. Vibration sensor 32 can then send vibration frequency signals to transmitter 12 (not shown in FIG. 3).

Figure 4:
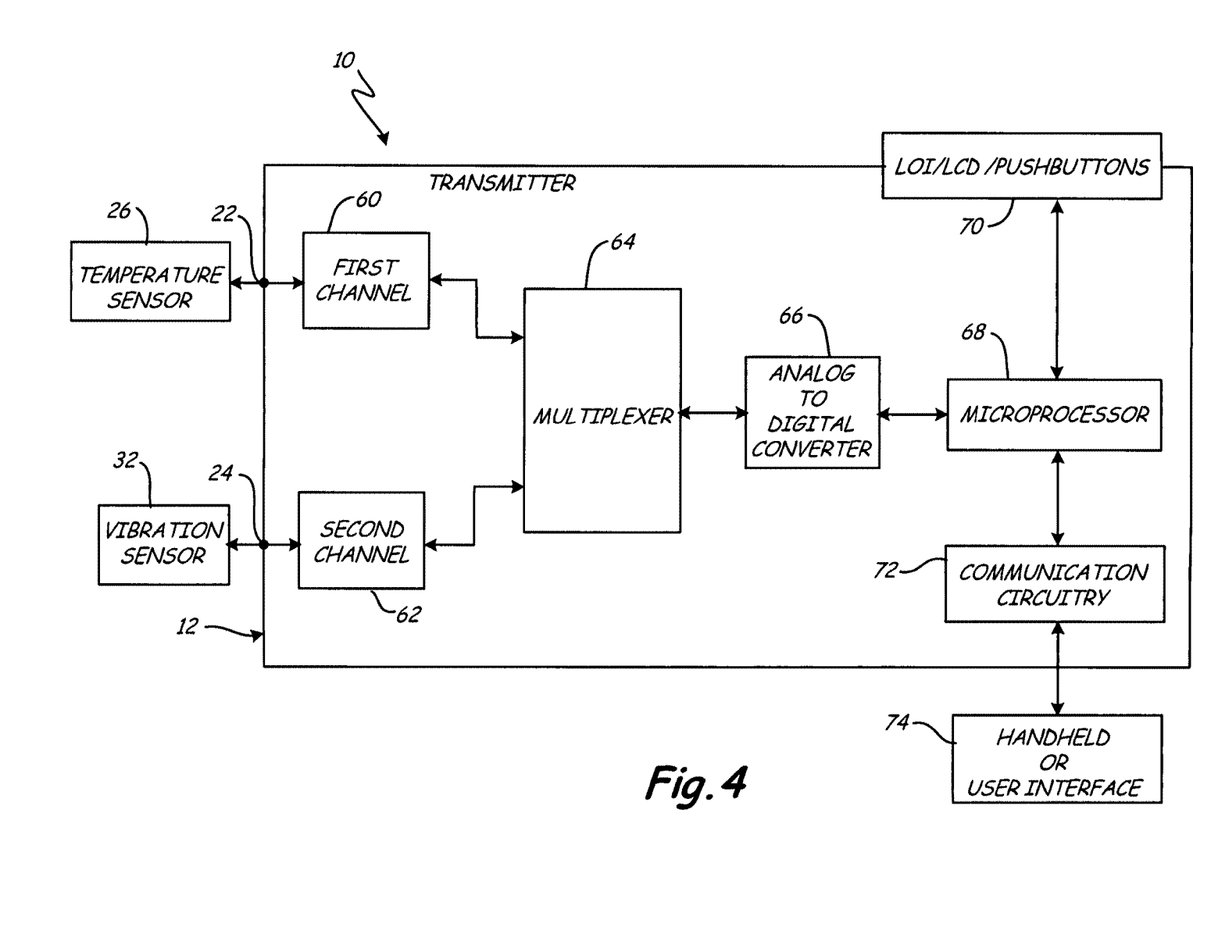
FIG. 4 is a block diagram of the temperature measurement point of FIG. 1A.

FIG. 4 is a block diagram of temperature measurement point 10, including components of transmitter 12. Transmitter 12 includes first channel 60, second channel 62, multiplexer 64, analog to digital (A/D) converter 66, microprocessor 68, local operator interface (LOI) 70, and communication circuitry 72. Temperature sensor terminal 22 connects temperature sensor 26 to first channel 60; and vibration sensor terminal 24 connect vibration sensor 32 to second channel 62. Multiplexer 64 receives analog signals from each of first channel 60 and second channel 62 and outputs the signals on a single line to A/D converter 66.

A/D converter 66 converts analog signals received from multiplexer 64 into digital signals and transmits the digital signals to microprocessor 68. Microprocessor 68 can be programmed with firmware or software for operating transmitter 12. The firmware can include measurement programming for calculating temperature values and vibration frequency based upon the digital signals received from A/D converter 66. Microprocessor 68 can be electrically connected to LOI 70 and have device description software for communication with an operator (or user). LOI 70 allows the operator to monitor and control operation of temperature measurement point 10. In one embodiment, LOI 70 can comprise a liquid crystal display (LCD) screen for displaying information from microprocessor 68 and a set of push buttons for inputting information to microprocessor 68. LOI 70 can be located directly on transmitter 12. Microprocessor 68 can also be connected to remote user interface 74 via communication circuitry 72. Transmitter 12 can be connected to remote user interface 74 via a wireless or a wired connection and communicate with a standard communication protocol such as HART® or Foundation™ Fieldbus. Preferably, remote user interface 74 can also allow a user to monitor and control operation of temperature measurement point 10. In one embodiment, remote user interface 74 can be a handheld device. In another embodiment, remote user interface 74 is a remotely located control room, which receives vibration and temperature information from transmitter 12. This allows a user in the control room to monitor temperature and vibration data at temperature measurement point 10, as well as other temperature measurement points. Many functions for transmitting information to and receiving information from transmitter 18 can be performed by either LOI 70 or remote user interface 74 or both. LOI 70 and remote user interface 74 will be referred to collectively as a user interface, herein, for simplicity. In other embodiments, temperature measurement point 10 can include more sensors, terminals, and channels than in the illustrated embodiment.

Figure 5:
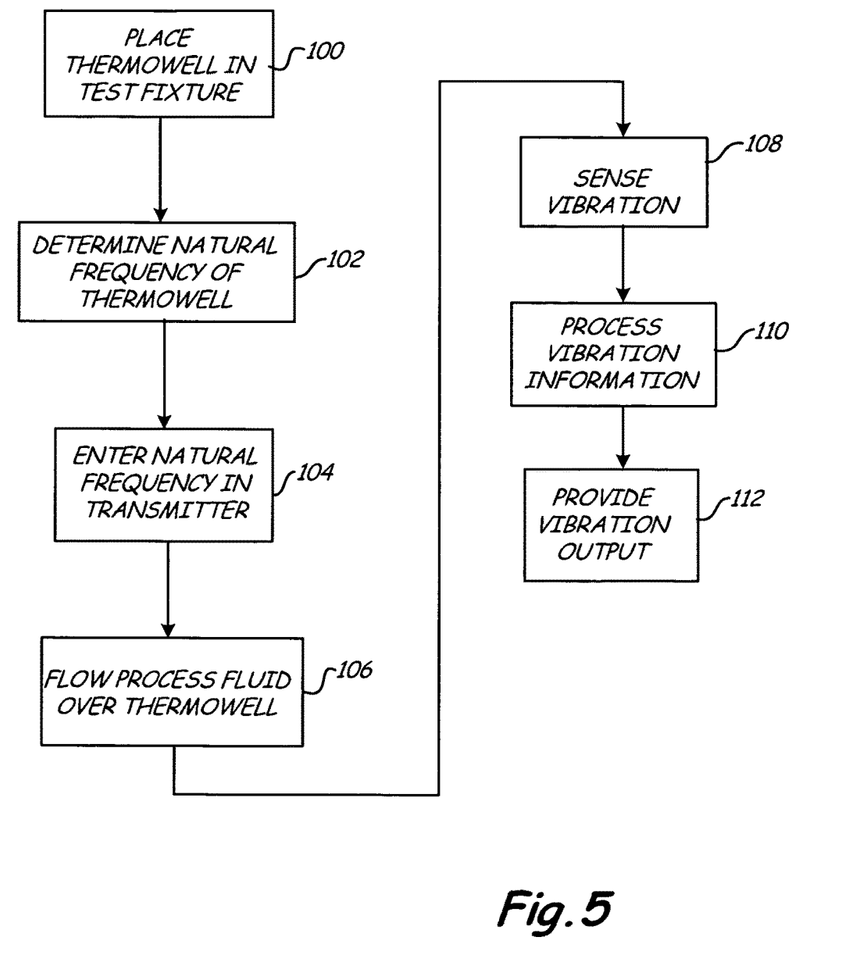
FIG. 5 is a flow chart of a method of monitoring condition of the temperature measurement point of FIG. 1A.

FIG. 5 is a flow chart of a method of monitoring condition of temperature measurement point 10 in an industrial process system. To begin, thermowell 42 is installed in a test fixture suitable for testing its natural frequency (step 100). One suitable test fixture can hold thermowell 42 relatively firmly at process connection portion 52 while allowing distal end 46 to remain free. Then the natural frequency of thermowell 42 is determined (step 102). Natural frequency can be determined by a variety of calculation methods or empirical means, such as striking thermowell 42 with a hammer near distal end 46 and measuring vibration with vibration sensor 32 fixedly mounted to thermowell 42. Once natural frequency of thermowell 42 is determined, the natural frequency value can then be inputted into transmitter 12 via a user interface such as LOI 70 or remote user interface 74 (step 104). The natural frequency value can also be etched onto thermowell 42 for future reference by an installer or user.

Then a process fluid is provided to flow over thermowell 42 (step 106). Ordinarily, step 106 would include removing thermowell 42 from the test fixture and installing it in a process at another location. When the process fluid flows over thermowell 42, thermowell 42 can vibrate due to fluid flow turbulence. Vibration frequency of thermowell 42 is then sensed by vibration sensor 32 (step 108). Transmitter 12 receives vibration information from vibration sensor 32 and subsequently processes the vibration information (step 110). Processing of vibration information can be performed in several ways. In one embodiment, transmitter 12 can calculate a sensed vibration frequency based upon the vibration information. In another embodiment, transmitter 12 can calculate the sensed vibration frequency and compare that sensed vibration frequency to a target frequency. The target frequency can be one of a variety of frequencies such as the natural frequency of thermowell 42 as inputted in step 104, or a predetermined frequency limit. The predetermined frequency limit can be a function of the natural frequency of thermowell 42, such as about 0.8 times the natural frequency. Additionally, there can be two or more predetermined frequency limits, such as about 0.8 times the natural frequency and about 1.2 times the natural frequency. The predetermined frequency limit can be preprogrammed into transmitter 12 during manufacture and can be adjustable using the user interface. In yet another embodiment, transmitter 12 can perform long term vibration trend monitoring to detect changes in the condition of thermowell 42 or changes in the process.

After the vibration information has been processed, a vibration diagnostic output is provided via the user interface (step 112). The vibration diagnostic output can take several forms. In one embodiment, the vibration diagnostic output can include a display of the sensed vibration frequency. In another embodiment, the vibration diagnostic output can include a display of the sensed vibration frequency as compared to the natural frequency. This comparison can include a showing of the actual numerical values of the sensed vibration frequency and the natural frequency, a showing of the sensed vibration frequency as a percentage of the natural frequency, or both. In yet another embodiment, transmitter 12 can provide an alert or indication triggered by the sensed vibration frequency exceeding the predetermined frequency limit. In still another embodiment, transmitter 12 can provide an alert or indication of impending thermowell failure based upon the long term vibration trend monitoring.

Each of these various types of vibration diagnostic outputs can be useful depending on how vibration information is processed and depending on user preferences. By providing a continuous display of the sensed vibration frequency, the user can monitor the vibration frequency whenever the user desires to do so. Recent ASME standards recommend that a thermowell's actual vibration frequency be no greater than 80% of the thermowell's natural frequency. By comparing the sensed vibration frequency to the natural frequency, the user can determine whether the process is operating within the ASME standard or within a different range preferred by the user. By providing actual vibration data to the user allows him or her to make decisions based upon that information and his or her own expertise. Alternatively, providing an alert or indication to the user only when the sensed vibration frequency exceeds a predetermined limit warns the user when failure may be imminent while freeing the user from having to make judgment determinations. Such a system can be useful when the process uses a large number of thermowells that can each have a different sensed vibration frequency and a different natural frequency. Additionally, an indication of impending thermowell failure based upon the long term vibration trend monitoring can be helpful when vibration levels do not appear to be catastrophic but when vibration over time has damaged the thermowell.

Figure 6:
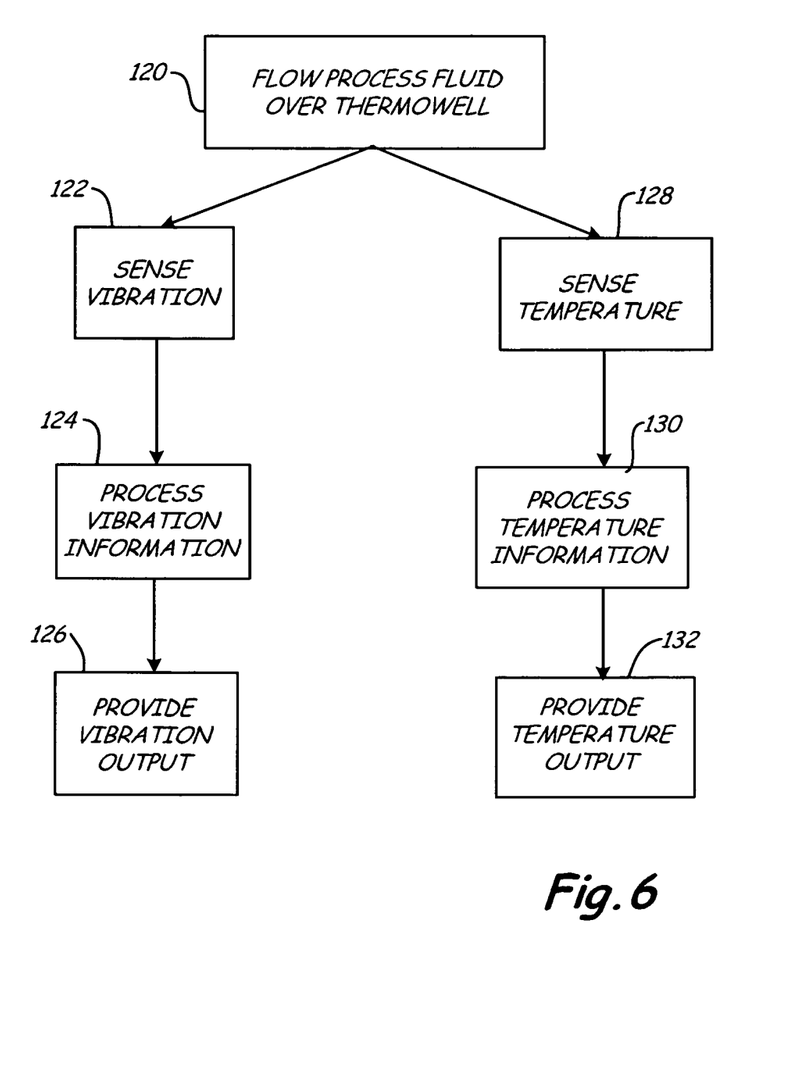
FIG. 6 is a flow chart of another method of monitoring condition of the temperature measurement point of FIG. 1A.

FIG. 6 is a flow chart of another method of monitoring condition of temperature measurement point 10 in an industrial process system. Upon starting this method, temperature measurement point 10 is already installed in a process. First, a process fluid is provided to flow over thermowell 42 (step 120). When the process fluid flows over thermowell 42, thermowell 42 can vibrate due to fluid flow turbulence. Vibration frequency of thermowell 42 is then sensed by vibration sensor 32 (step 122). Transmitter 12 receives vibration information from vibration sensor 32 and subsequently processes the vibration information (step 124).

Transmitter 12 can process vibration information in each of the ways described above with respect to the method shown in FIG. 5. After the vibration information has been processed, a vibration diagnostic output is provided via the user interface (step 126). Transmitter 12 can provide the vibration diagnostic output in each of the ways described above with respect to the method shown in FIG. 5.

While steps 122, 124, and 126 are being performed, steps 128, 130, and 132 can be performed concurrently. Temperature of the process near thermowell 42 is sensed by temperature sensor 26 (step 128). Transmitter 12 receives temperature information from temperature sensor 26 and subsequently processes the temperature information (step 130). Transmitter 12 calculates a sensed process temperature based upon the temperature information. The manner of calculating the sensed process temperature depends on whether temperature sensor 26 is a resistance temperature detector (RTD), a thermocouple, or some other temperature sensor. Such calculations are, however, well known in the art and will not be further described herein. After the sensed process temperature is calculated, a temperature output is then provided via the user interface (step 132). The temperature output can be a visual indication of the sensed process temperature.

In the method shown in FIG. 6, transmitter 12 can simultaneously process and provide temperature information to a user while also processing and providing thermowell vibration information to the user. Using a single transmitter to monitor both temperature and vibration avoids having to add an additional transmitter that is dedicated to vibration monitoring.

In an alternative embodiment, monitoring thermowell vibration frequency can use electronics entirely separate from the temperature measurement electronics. This allows a user to install vibration monitoring equipment into a process without having to replace existing temperature measurement transmitters.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed, but that the invention will include all embodiments falling within the scope of the appended claims. For example, circuitry inside transmitter 12 can differ from those specifically illustrated in FIG. 4. Additionally, the first and second methods described above may be performed with equipment other than temperature measurement point 10, so long as the equipment is compatible with the chosen method.

The invention claimed is:

1. A method of monitoring condition of a temperature measurement device in an industrial process system, the method comprising:

sensing vibration frequency of a thermowell of the temperature measurement device, wherein the thermowell is positioned in a process fluid flow passage, wherein the vibration frequency is sensed by a vibration sensor fixedly attached to a portion of the thermowell substantially isolated from a process fluid in the process fluid flow passage, and wherein the vibration frequency of the thermowell is caused by turbulence created by flow of the process fluid over and around the thermowell;

receiving at a transmitter the vibration frequency provided by the vibration sensor and temperature data provided by a temperature sensor positioned inside a bore cavity of the thermowell;

comparing the sensed vibration frequency to a natural frequency of the thermowell;

providing a temperature output based upon the temperature data;

determining condition of the thermowell based upon the vibration frequency sensed; and providing a diagnostic output of the sensed vibration frequency as compared to the natural frequency of the thermowell.

2. The method of claim 1, wherein the vibration sensor comprises an accelerometer.

3. The method of claim 1, wherein the vibration sensor is positioned inside the bore cavity.

4. The method of claim 1, wherein the vibration sensor is positioned inside a bore cavity of the thermowell.

5. The method of claim 1, wherein the vibration sensor is positioned exterior of a bore cavity of the thermowell.

6. A temperature measurement device comprising:

a thermowell comprising a bore cavity;

a vibration sensor fixedly attached to a portion of the thermowell substantially isolated from a process fluid for sensing vibration frequency of the thermowell caused by turbulence created by flow of process fluid over and around the thermowell;

a temperature sensor positioned inside the bore cavity; and a transmitter electrically connected to the temperature sensor and to the vibration sensor, wherein the transmitter is programmed to calculate temperature values based upon data received from the temperature sensor, to calculate oscillation frequency based upon data received from the vibration sensor, to compare the oscillation frequency to a natural frequency of the thermowell, and to generate a diagnostic output of the sensed vibration frequency as compared to the natural frequency of the thermowell.

7. The temperature measurement device of claim 6, wherein the vibration sensor comprises an accelerometer.

8. The temperature measurement device of claim 6, and further comprising:

a user interface in communication with the transmitter, wherein the user interface produces an indication of impending thermowell failure based upon a signal from the transmitter.

9. The temperature measurement device of claim 6, wherein the vibration sensor is positioned exterior of the bore cavity.

10. The temperature measurement device of claim 6, wherein the vibration sensor is positioned inside the bore cavity.

11. The temperature measurement device of claim 10, and further comprising:

a vibration sensor lead electrically connecting the vibration sensor to the transmitter;

a temperature sensor lead electrically connecting the temperature sensor to the transmitter;

a fitting connecting the thermowell to the transmitter, wherein the fitting comprises a fitting passage, and wherein the vibration sensor lead and the temperature sensor lead both extend through the fitting passage.

12. A transmitter, comprising:
- a first terminal for electrically connecting to a temperature sensor positioned inside a thermowell for sensing temperature of process fluid in contact with the thermowell;
- a second terminal for electrically connecting to a vibration sensor positioned inside the thermowell for sensing vibration frequency of the thermowell caused by turbulence created by flow of the process fluid over and around the thermowell;
- a microprocessor electrically connected to the first and second terminals, wherein the microprocessor is programmed to calculate temperature values based upon data received from the first terminal, to calculate vibration frequency based upon data received from the second terminal, to compare the vibration frequency to a natural frequency of the thermowell; and
- communication circuitry electrically connected to the microprocessor, wherein the communication circuitry is programmed to transmit the temperature values and the diagnostic output to a user interface.

13. The transmitter of claim 12, wherein the target frequency is a predetermined frequency limit as a function of a natural frequency of the thermowell.

14. A method of monitoring condition of a temperature measurement device in an industrial process system, the method comprising:

sensing vibration frequency of a thermowell of the temperature measurement device, wherein the thermowell is positioned in a process fluid flow passage, wherein the vibration frequency is sensed by a vibration sensor fixedly attached to a portion of the thermowell substantially isolated from a process fluid in the process fluid flow passage, and wherein the vibration frequency of the thermowell is caused by turbulence created by flow of the process fluid over and around the thermowell;

receiving at a transmitter the vibration frequency provided by the vibration sensor and temperature data provided by a temperature sensor positioned inside a bore cavity of the thermowell;

comparing the sensed vibration frequency to a natural frequency of the thermowell;

providing a temperature output based upon the temperature data;

determining condition of the thermowell based upon the vibration frequency sensed; and providing a diagnostic output of the sensed vibration frequency as compared to the natural frequency of the thermowell.

* * * * *